United States Patent
Eoh

(10) Patent No.: US 9,167,192 B2
(45) Date of Patent: Oct. 20, 2015

(54) DISPLAY SYSTEM

(71) Applicant: Shik Eoh, Chungcheongnam-Do (KR)

(72) Inventor: Shik Eoh, Chungcheongnam-Do (KR)

(*) Notice: Subject to any disclaimer, the term of this patent is extended or adjusted under 35 U.S.C. 154(b) by 79 days.

(21) Appl. No.: 14/073,203

(22) Filed: Nov. 6, 2013

(65) Prior Publication Data

US 2014/0061425 A1    Mar. 6, 2014

Related U.S. Application Data

(63) Continuation of application No. PCT/KR2012/002486, filed on Apr. 3, 2012.

(30) Foreign Application Priority Data

May 13, 2011  (KR) .................. 10-2011-0044991
Jul. 12, 2011  (KR) .................. 10-2011-0069096
Feb. 28, 2012  (KR) .................. 10-2012-0020270

(51) Int. Cl.

| A47B 19/00 | (2006.01) |
|---|---|
| H04N 5/46 | (2006.01) |
| H04N 5/64 | (2006.01) |
| F16M 13/02 | (2006.01) |
| F16M 11/12 | (2006.01) |
| F16M 11/18 | (2006.01) |
| F16M 11/20 | (2006.01) |
| F16M 11/24 | (2006.01) |
| A47C 21/00 | (2006.01) |

(52) U.S. Cl.
CPC .............. *H04N 5/46* (2013.01); *A47C 21/003* (2013.01); *F16M 11/126* (2013.01); *F16M 11/18* (2013.01); *F16M 11/2014* (2013.01); *F16M 11/2092* (2013.01); *F16M 11/24* (2013.01); *F16M 13/022* (2013.01); *H04N 5/64* (2013.01)

(58) Field of Classification Search
CPC ............................. H04N 5/46; F16M 13/022
USPC ........ 248/441.1, 445, 447, 451, 550; 5/503.1, 5/658

See application file for complete search history.

(56) References Cited

U.S. PATENT DOCUMENTS

| 4,017,920 A * | 4/1977 | Sieg ................................ 5/507.1 |
| 4,465,255 A * | 8/1984 | Hill ............................. 248/441.1 |
| 4,848,710 A * | 7/1989 | Newman ....................... 248/129 |

(Continued)

FOREIGN PATENT DOCUMENTS

| JP | 11-167459 A | 6/1999 |
| JP | 2003-330571 A | 11/2003 |
| KR | 10-2005-0099402 A | 10/2005 |

*Primary Examiner* — Gwendolyn W Baxter
(74) *Attorney, Agent, or Firm* — Mintz Levin Cohn Ferris Glovsky and Popeo, P.C.; Kongsik Kim

(57) ABSTRACT

A display system includes a base member, a rear support member which is connected to one end of the base member in an upward and downward direction, a display device, a support unit which is disposed on an upper portion of the rear support member, and supports the display device such that the display device is movable in position and changeable in position in at least two axial directions, a sound output device which is disposed on the display device and the rear support member, and a control device which controls operations of the support unit, the sound output device and the display device. A bed, a mattress, a bedding covering or the like is provided on the base member such that a user can watch a screen of the display device in a posture where the user has lain above the base member.

16 Claims, 22 Drawing Sheets

(56) References Cited

U.S. PATENT DOCUMENTS 7,418,747 B1 * 9/2008 Myers ............................... 5/308
8,408,504 B1 * 4/2013 Gonzales ..................... 248/158
2006/0022096 A1 * 2/2006 Chan et al. ................... 248/129
2007/0252068 A1 * 11/2007 Secora ......................... 248/458

* cited by examiner

DISPLAY SYSTEM

CROSS-REFERENCE TO RELATED APPLICATIONS

The present application is a continuation application of International Application No. PCT/KR2012/002486 filed on Apr. 3, 2012, which claims priority to Korean Patent Application No. 10-2011-0044991 filed on May 13, 2011, Korean Patent Application No. 10-2011-0069096 filed on Jul. 12, 2011, and Korean Patent Application No. 10-2012-0020270 filed on Feb. 28, 2012, which applications are incorporated herein by reference.

TECHNICAL FIELD

The present invention relates, in general, to a display system and, more particularly, to a display system which is disposed on a bed or the like such that a user can freely watch what is displayed when the user is in a posture where he/she has lain down.

BACKGROUND ART

Recently, flat panel display type TVs including liquid crystal display (LCD) TVs and plasma display panel (PDP) TVs occupy most of the TV market. Such flat panel display type TVs have advantages over conventional cathode ray tube (CRT) TVs in that high definition, a large screen size, a light weight and a slim profile can be realized.

Such flat panel display type TVs are configured such that they can be disposed at preset positions in a living room or a bed room using a pedestal or be mounted on a wall using a wall-hanging bracket device, whereby users can watch the TVs.

However, as for such flat panel display type TVs, it is not easy to change positions where the TVs are disposed. In addition, it is not easy for users to comfortably watch TVs with a suitable viewing angle in a posture in which they have lain on the floor, bed or the like, which is problematic.

In addition, at a typical home, a bed is placed inside a room, and a TV is disposed in a living room or on a wall. Considering this, the user who has lain on the bed is spaced too apart from the TV which is disposed on the wall or the like. It is therefore difficult for the user to comfortably watch the TV. It is also difficult to properly transmit sounds from the TV to the user. Therefore, there are problems in that it is difficult to comfortably watch the TV and sound production is not satisfactory.

In addition, since there are no means for providing the user with the comfortable and clean bed state, it is difficult to improve the surrounding environment while staying on the bed for a long time. This causes bad effects to health, which are problematic.

Furthermore, there is a problem in that it is difficult for the user to check or improve his/her health condition while staying on the bed for a long time.

SUMMARY

Accordingly, the present invention has been made keeping in mind the above problems occurring in the prior art, and an object of the present invention is to provide a display system which a user can freely watch when the user is in the posture where he/she has lain on a bed or the like.

In order to accomplish the above object(s), the present invention provides a display system that includes: a base member; a rear support member which is connected to one end of the base member in an upward and downward direction; a display device; a support unit which is disposed on an upper portion of the rear support member, and supports the display device such that the display device is movable in position and changeable in position in at least two axial directions; a sound output device which is disposed on the display device and the rear support member; and a control device which controls operations of the support unit, the sound output device and the display device. A bed, a mattress, a bedding covering or the like is provided on the base member such that a user can watch a screen of the display device in a posture where the user has lain above the base member.

It is preferred that the base member define therein an inner space, and comprises a plurality of coupling members which protrude upward, the plurality of coupling members detachably engaging with the rear support member.

In addition, it is preferred that the support unit include a main post which is disposed on an upper portion of the rear support member; a lift post which is disposed on the main post such that a height thereof is adjustable in an upward or downward direction; a pivot member which is rotatably disposed on an upper portion of the lift post; an extension member which extends from the pivot member such that a length thereof is adjustable; and a connecting member which connects and supports the display device to an end of the extension member such that a position of the display device is changeable.

Furthermore, it is preferred that the support unit include a lift-driving part which drives the lift post to move upward or downward with respect to the main post; a pivot-driving part which drives the pivot member to rotate with respect to the lift post; a reciprocation-driving part which causes the extension member to linearly reciprocate with respect to the pivot-driving member; and an angle adjustment driving part which is disposed on the connecting member, and adjusts an angle of the display device in an upward and downward direction and a lateral direction.

In addition, it is preferred that the sound output device include a first speaker which is movably disposed on the display device; one or more second speakers which are disposed on an upper portion of the rear support member; and a third speaker which is disposed on a front portion of the rear support member or the base member.

Furthermore, it is preferred that the display system further include: an input device which is disposed on the display device such that the input device is reciprocally slidable; and a control switch which changes screen information displayed on the display device depending on a position to which the input device has moved. A TV screen or a PC screen is selectively displayed on the display device due to an on/off operation of the control switch.

In addition, it is preferred that the display system further include a sterilization unit which is disposed on the display device and uses UV radiation or IR radiation.

Furthermore, it is preferred that the display system further include a thermometer which is disposed on at least one of the display device, the rear support member and the support unit. The thermometer measures body temperature through IR radiation scanning in response to the control device.

In addition, it is preferred that the display system further include an air cleaner which is disposed on the rear support member, an air control function of the air cleaner being controllable by the control device.

Furthermore, it is preferred that the display system further include an illumination device which is disposed on at least one of the rear support member and the support unit, an intensity of illumination of the illumination device being adjustable by the control device.

In addition, it is preferred that the illumination device include a light support which is disposed movable with respect to the rear support member; one or more lights which are supported by the light support, and are drive-controlled by the control device independently from each other; and a light switch which selects an on/off operation of the light.

Furthermore, it is preferred that the one or more lights include a typical light and a psychedelic light, and the control device selectively drives the typical light or the psychedelic light in response to an operation signal of the light switch.

In addition, it is preferred that the support unit include a main post which is disposed on the rear support member; a lift post which is disposed on the main post such that a height thereof is adjustable in an upward or downward direction; a pivot assembly which is rotatably disposed on the lift post, and has one or more joints which are adjustable in angle; and a connecting member which connects the pivot assembly to the display device.

Furthermore, it is preferred that the display system further include a lift-driving part which drives the lift post to move upward or downward with respect to the main post; and a pivot-driving part which drives the pivot assembly to rotate with respect to the lift post.

In addition, it is preferred that the control device control to forcibly stop the pivot-driving part operating when a load that is equal to or greater than a predetermined pivot load occurs when the pivot-driving part is operating.

Furthermore, it is preferred that the display system further include an auxiliary member which is detachably disposed on the base member or the rear support member, wherein, when the base member is installed in a bed, the auxiliary member is mounted so as to support a load of the rear support member at a height of the bed.

The display system according to the present invention allows the user to watch the screen of a TV, a PC monitor, or the like in the posture where he/she has lain on a sleeping area, such as a bed, a mattress, a quilted mattress, or the like. Accordingly, the user can use the display device in the posture more comfortably than in the related art.

In addition, since the user uses the display device in the posture where he/she has lain on a sleeping area, the display device can be used in the state where indoor lights are turned off. Since light is concentrically provided to the user who has lain on the sleeping area, the user can comfortably watch the TV or use the screen of the PC monitor or the like without disturbing others. It is also possible to provide dim light when moody illumination is desired. Accordingly, the illumination device can be used depending on the use and preference.

Furthermore, since it is possible to set the position of use and the initial position of the display device, it is possible to automatically adjust the position to the position of use or the initial position through an on/off operation of the display device. There is an advantage in that the user can easily use the display device without having to adjust the position every time that he/she uses the display device.

In addition, since the air cleaner, the ultraviolet (UV) radiation sterilization unit and the infrared (IR) thermometer are added, there are advantages in that the user can maintain a clean surrounding environment and check his/her health condition by measuring his/her body temperature.

BRIEF DESCRIPTION OF DRAWINGS

FIG. 1b is a front elevation view showing a part of the display system shown in FIG. 1a;

FIG. 2 is a view showing the base member and the rear support member shown in FIG. 1a;

FIG. 3 is a front elevation view of the display system shown in FIG. 1a;

FIG. 4 is a rear elevation view of the display system shown in FIG. 1a;

FIG. 5 is a right side elevation view of the display system shown in FIG. 1a;

FIG. 6 is a left side elevation view of the display system shown in FIG. 1a;

FIG. 7 is a top plan view of the display system shown in FIG. 1a;

DETAILED DESCRIPTION

Figure 1A:
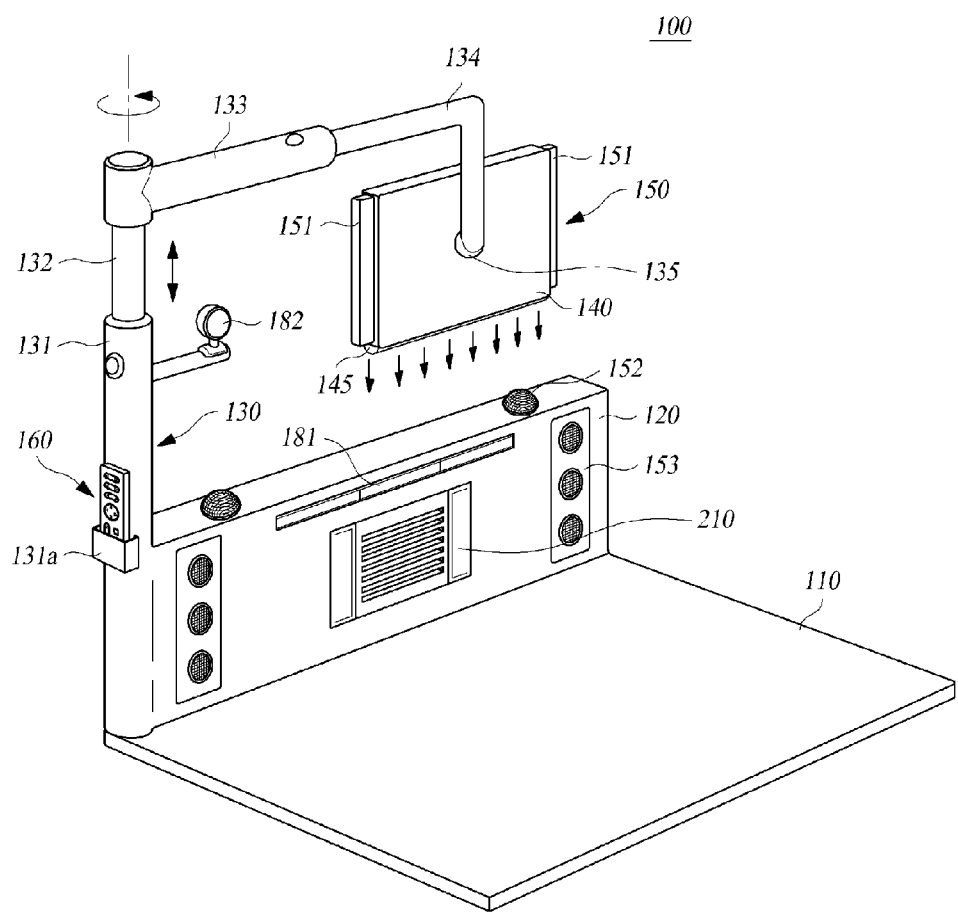
FIG. 1a is a perspective view showing a display system according to a first embodiment of the present invention.

Reference will now be made in greater detail to a display system according to the present invention, exemplary embodiments of which are illustrated in the accompanying drawings.

Reference will now be made in greater detail to a display system according to the present invention, exemplary embodiments of which are illustrated in the accompanying drawings.

Referring to FIG. 1a to FIG. 9, a display system 100 according to a first embodiment of the present invention includes a base member 110, a rear support member 120 disposed on one end of the base member 110, a support unit 130 disposed on the rear support member 120, a display device 140 supported by the support unit 130, a sterilization unit 145, an sound output device 150, and a control device 160.

Figure 3:
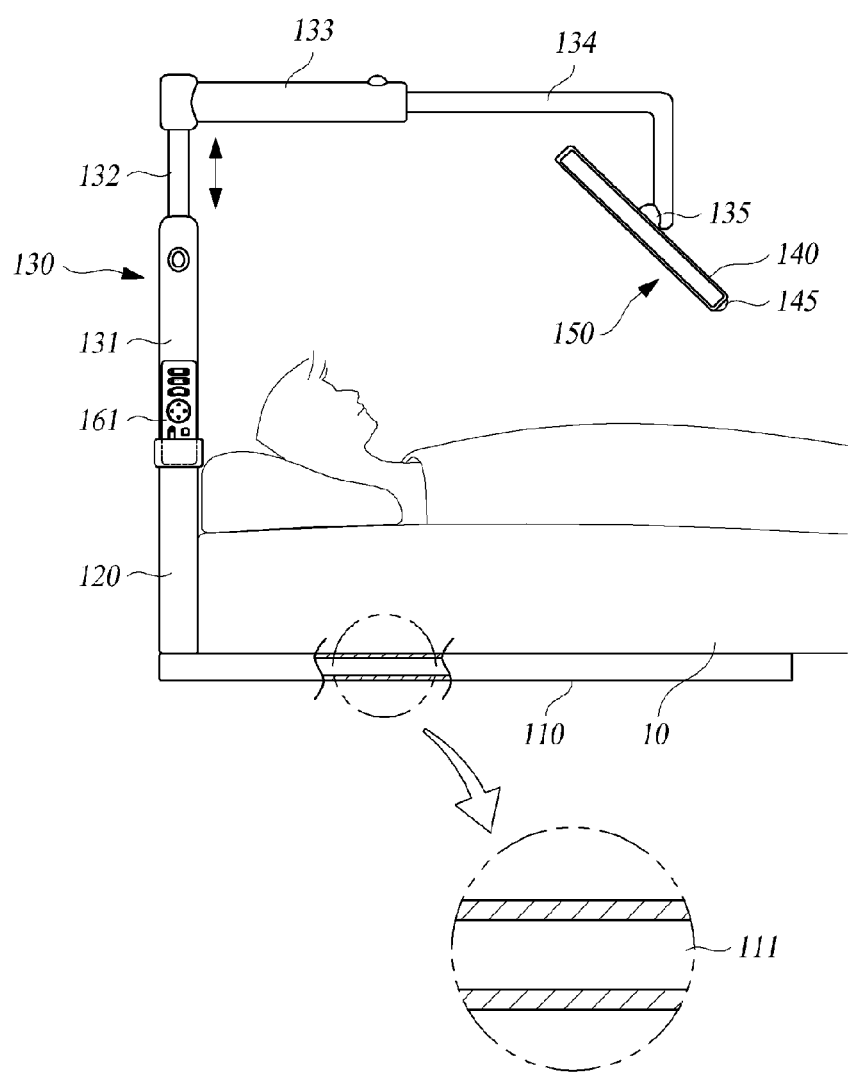
Figure 4:
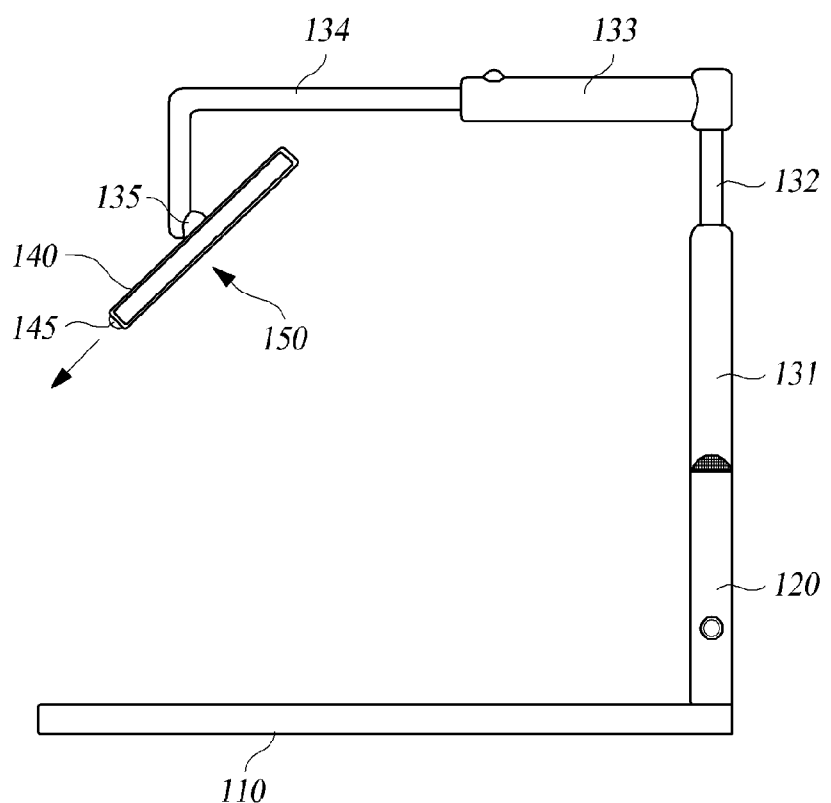
Figure 5:
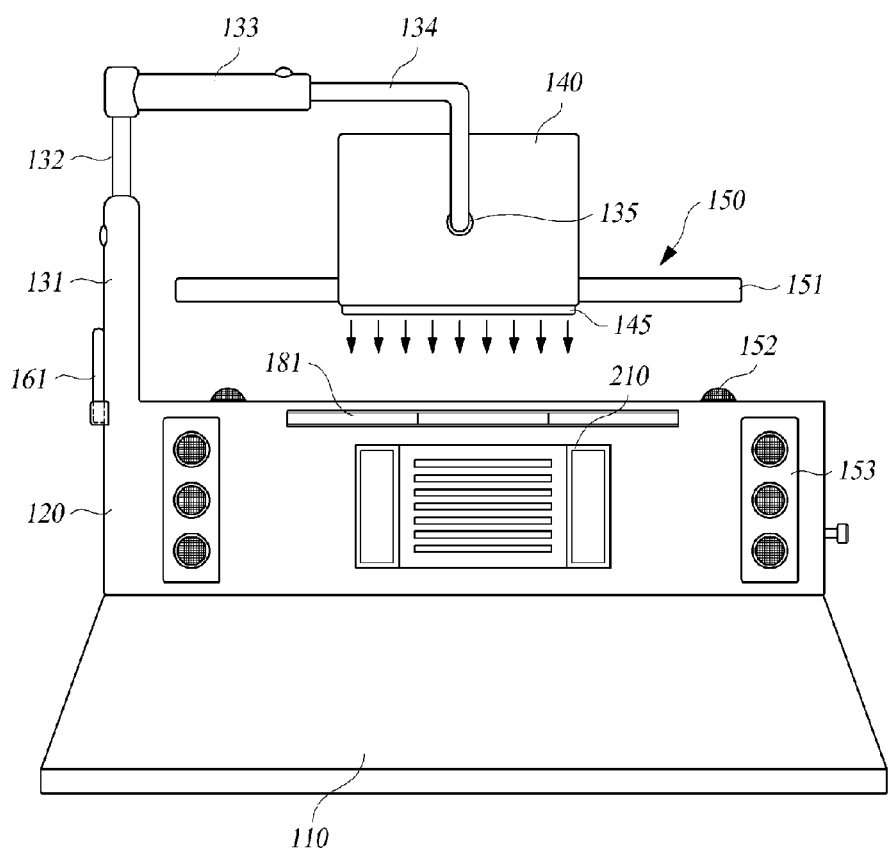
Figure 6:
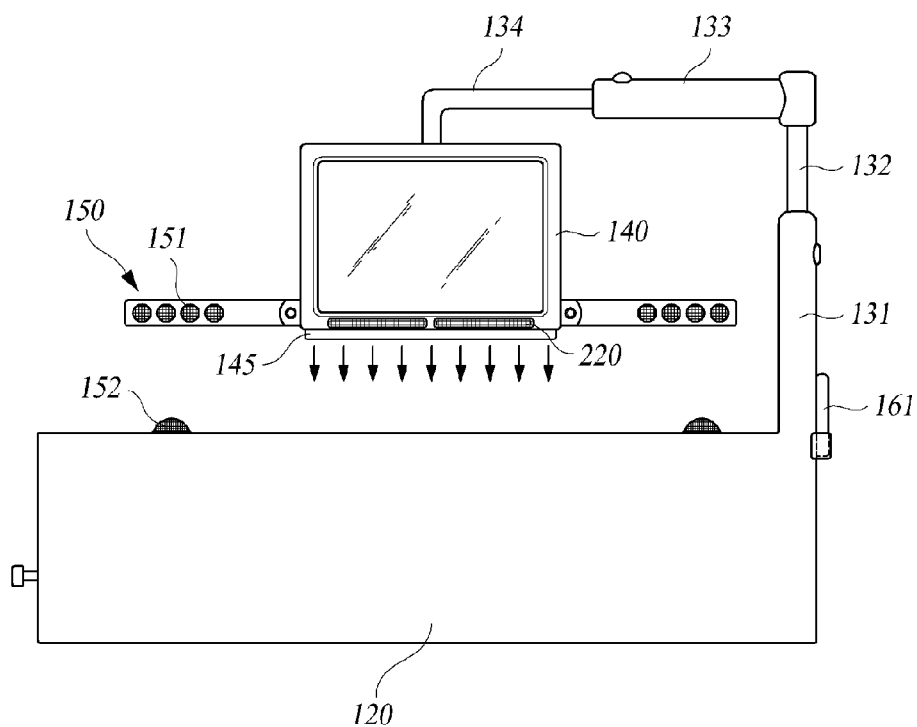
Figure 7:
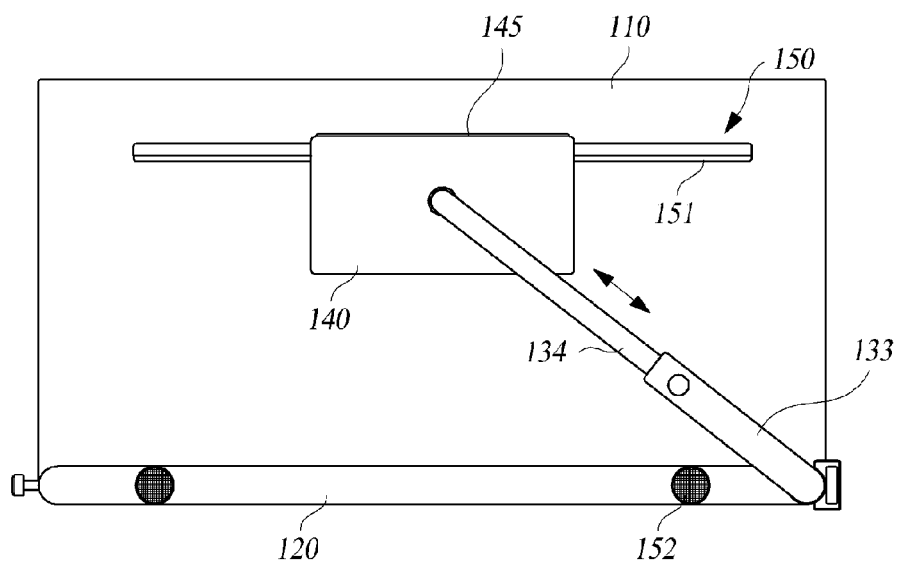
Figure 8:
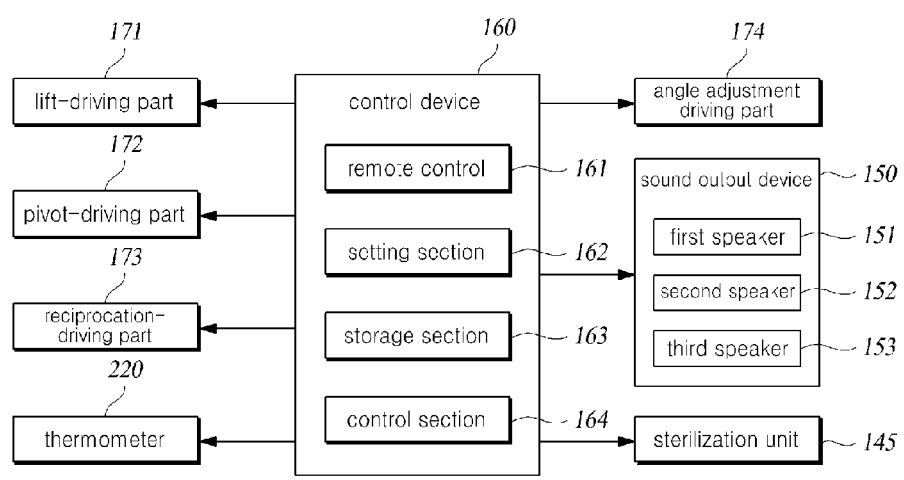
FIG. 8 is a block configuration diagram illustrating the display system according to the first embodiment of the present invention.
Figure 9:
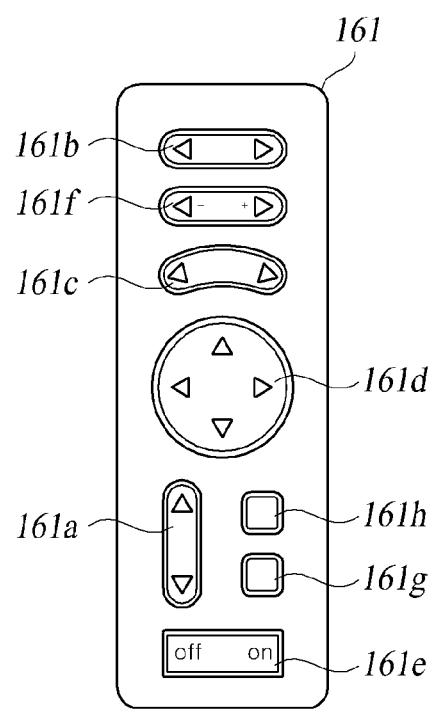
FIG. 9 is a view illustrating the remote control shown in FIG. 8.

The base member 110 is made of a material such as metal, and has defined therein a hollow space 111 (see FIG. 3). This allows sound and vibration transmitted through the rear support member 120 to create a vibration effect while being transferred into the hollow space 111, thereby improving sound production. The base member 110 is provided on one end thereof with a plurality of coupling members 112 and 113, with which the base member 110 is coupled with the rear support member 120. The coupling members 112 and 113 can be formed integrally with the base member 110 or be coupled to the base member 110 after being separately fabricated. As shown in FIG. 3, the base member 110 having this configuration is disposed such that it is laid under a bed or a mattress 10.

The rear support member 120 is coupled to one end of the base member 110 such that it is erected in the upward and downward direction. It is preferred that the rear support member 120 be assembled to the base member 110 through the coupling members 112 and 113 such that the rear support member 120 can be coupled to and decoupled from the base member 110. This rear support member 120 also has an inner space, and is provided at the lower end with coupling portions 121 and 123 into which the coupling members 112 and 113 can be fitted for engagement. The coupling portions 121 and 123 can be implemented in the shape of coupling holes or coupling recesses.

In addition, provided is a locking unit for maintaining the rear support member 120 and the base member 110 in the engaged state. The locking unit includes a locking member 126 which is disposed inside the rear support member 120 and has a plurality of locking hooks 126a, a spring 127 which elastically presses the locking member 126 to the locking position, a release button 125 which is disposed such that it protrudes from the rear support member 120 in order to force the locking member 120 into the unlocking position, and locking portions 112a and 113a which are respectively provided on the coupling members 112 and 113.

According to this configuration, when the coupling members 112 and 113 are fitted into and engaged with the coupling portions 121 and 123, the locking hooks 126a are fitted into and locked to the locking portions 112a and 113a of the coupling members 112 and 113, i.e. the locking recesses, and the locked state is supported by the elastic force of the spring 127. When it is intended to separate the coupling members 112 and 113 from the coupling portions 121 and 123, the coupling members 112 and 113 can be released after the release button 125, which protrudes from the side of the rear support member 120, is forcibly pressed inward so that the locking hooks 126a are separated from the locking portions 112a and 113a.

The support unit 130 includes a main post 131 which is disposed on the upper portion of one side of the rear support member 120, a lift post 132 which is disposed on the main post 131 such that it can be adjusted in height in the upward and downward direction, a pivot member 133 which is rotatably disposed on the upper portion of the lift post 132, an extension member 134 which extends from the pivot member 133 such that the length of the extension member 134 can be adjusted, and a connecting member 135 which connects and supports the display device 140 to one end of the extension member 134 such that the position and direction of the display device 140 can be changed. The main post 131 is fixedly disposed on the upper portion of one side of the rear support member 120. A holding portion 131a which holds a remote control 161 can be disposed on the main post 131.

The lift post 132 is disposed on the main post 131 such that it can slide upward and downward along the main post 131, whereby the height of the pivot member 133 can be adjusted. The lift post 132 can be automatically driven in the upward and downward direction by a separate lift-driving part 171 which is disposed in the main post 131 such that the lift post 132 can move upward and downward. The lift-driving part 171 can operate in response to a control signal from the control device 160. The lift-driving part 171 can be embodied based on a variety of known technologies. The lift-driving part 171 can be configured such that it drives the lift post 132 in the upward and downward direction using a linear motor, a lead screw connected to a spindle motor, or the like.

The pivot member 133 is pivotably disposed on the upper portion of the lift post 132. The pivot member 133 is configured such that it locates the display device 140 at the position shown in FIG. 1a at normal times and moves the display device 140 to the front in the sight of a user when the user intends to watch the display device 140 in the position shown in FIG. 3 where he/she has lain on the bed. Pivoting of the pivot member 133 can be automatically adjusted by a pivot-driving part 172. The pivot-driving part 172 can include a spindle motor which is disposed in the lift post 132 and rotates the pivot member 133 when it operates. The pivot-driving part 172 can be configured such that a reduction gear train is disposed between the spindle motor and the pivot member 133 and is connected to a drive shaft of the spindle motor to reduce the speed of rotation. Since the technical configuration of the pivot-driving part 172 can also be easily understood from those that are widely used in the industry, specific embodiments thereof will neither be shown in the figures nor described.

The extension member 134 is connected to the pivot member 133 such that its length can be adjusted. The extension member 134 is bent downward substantially at a middle portion thereof such that it can support the display device 140. The extension member 134 is also configured such that the extension member 134 can be driven by a reciprocation-driving part 173 so as to reciprocate with respect to the pivot member 133 in the horizontal direction. The reciprocation-driving part 173 can have the same configuration as the lift-driving part 171, and be disposed inside the pivot member 133. The reciprocation-driving part 173 and the pivot-driving part 172 can also be selectively controlled to operate by a control signal from the control device 160.

The connecting member 135 is disposed at a free end of the extension member 134, and supports the display device 140 such that the position and direction of the display device 140 can be changed. Specifically, the connecting member 135 is configured such that it connects the display device 140 to the extension member 134 so that the angle of the display device 140 can be respectively adjusted in the upward and downward direction and the lateral direction. An angle adjustment driving part 174 can be disposed inside the connecting member 135. The angle adjustment driving part 174 can be implemented as a fan-tilting device which is typically configured for fan-tilting driving of a security closed-circuit TV (CCTV) camera. Since the configuration of the fan-tilting device is a technical configuration that can be easily understood from known technologies, specific embodiments thereof will neither be shown in the figures nor described. In the meantime, the angle adjustment driving part 174 can also be selectively controlled to operate by the control device 160.

The display device 140 can include a liquid crystal display (LCD) TV or a plasma display panel (PDP) TV of various sizes. The rear surface of the display device 140 is connected to the connecting member 135 such that the screen of the display device 140 is exposed to the front. Here, the display device 140 can be connected to the connecting member 135 such that the angle thereof can be automatically adjusted in the upward and downward direction and the lateral direction by the angle adjustment driving part 17, such as the fan-tilting device, as described above. Alternatively, the angle can be manually adjusted.

The sterilization unit 145 can be implemented as an ultraviolet (UV) radiation lamp or an infrared (IR) radiation lamp, and the shape and arrangement thereof can vary.

The UV radiation lamp has the function of sterilizing a variety of harmful bacteria and microorganisms that live in a sleeping area or the like where a bed or a mattress is placed using a UV wavelength emitted therefrom. Since UV radiation can cause side effects such as skin cancer when the human body is exposed to an excessive amount of UV radiation, it is not preferable to directly expose the human body to UV radiation. Therefore, it is preferred that the bed be sterilized or disinfected with UV radiation when a person is not using the bed. Accordingly, a user can sleep on the mattress or the bed which is in the clean state.

IR radiation emitted from the IR radiation lamp is a type of an electromagnetic wave like visible light or UV radiation, and its wavelength is longer than that of visible light. Since the wavelength of IR radiation is in substantially the same range as the natural frequency of molecules that compose matter, the energy of an IR light wavelength is effectively absorbed to matter due to electromagnetic resonance when IR radiation strikes the matter. Thus, this thermal action helps eliminate bacteria that cause a variety of diseases in the human body while promoting the circulation of the blood and the creation of cell tissues by expanding capillary vessels. Accordingly, this can be a great help to a user in terms of health, cosmetic treatment and disease prevention.

In the sterilization unit 145, the sterilization time setting, the on/off operation of the UV radiation lamp and the IR radiation lamp, or the like can be controlled by the control device 160.

The sound output device 150 includes first speakers 151, second speakers 152 and third speakers 153. The first speakers 151 are disposed on both sides of the display device 140 such that they can pivot in the upward and downward direction. The first speakers 151 are disposed on the display device 140 such that they output sound in the forward direction.

The second speakers 152 can be respectively disposed at a plurality of points on the upper end of the rear support member 120. The second speakers 152 can increase the sound production by outputting sound from behind the user.

The third speakers 153 are disposed such that they output sound from the front side of the rear support member 120. It is preferred that the third speakers 153 be woofer speakers. A sound frequency produced from the third speakers 153 can be transmitted to the base member 110 through the coupling member 113 so that the amplitude of the sound frequency can be enlarged through a space 111 inside the base member 110, whereby the user can be provided with magnificent sound information that his/her body can feel.

The volume of the first to third speakers 151, 152 and 153 can be respectively controlled by the control device 160.

In addition, the rear support member 120 can also be provided with an air cleaner 210. Since the air cleaner converts polluted air into fresh air by filtering the polluted air, the user can enjoy a comfortable and clean environment.

In addition, the display system 100 can be provided with an illumination device 180. The illumination device 180 includes a first light 181 and a second light 182.

The first light 181 can be disposed on the rear support member 120, and illuminates an area in front of the rear support member 120. The first light 181 can be used for illumination of a mood lamp when a dim lighting atmosphere is desired in a bedroom.

In the meantime, the second light 182 can be disposed on the main post 131 using a separate bracket or the like such that the angle thereof can be adjusted in the upward and downward direction and the lateral direction. The second light 182 can be used when a display, such as a TV or a PC monitor, is being watched, i.e. when concentrated and bright illumination is desired.

The illumination device 180 can include a light-emitting diode (LED) lamp, and be on/off-operated by the control operation of the control device 160. In addition, the intensity of illumination light from the illumination device 180 can be adjusted under the control of the control device 160.

Figure 1B:
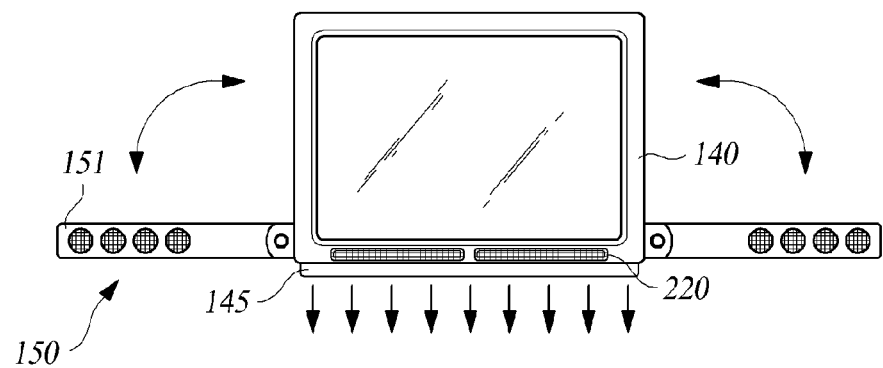

In addition, as shown in FIG. 1b, the display device 140 can also be provided with a thermometer 220. The thermometer 220 can check the health condition of the user by detecting and measuring the body temperature of the user through scanning with IR radiation.

Figure 1C:
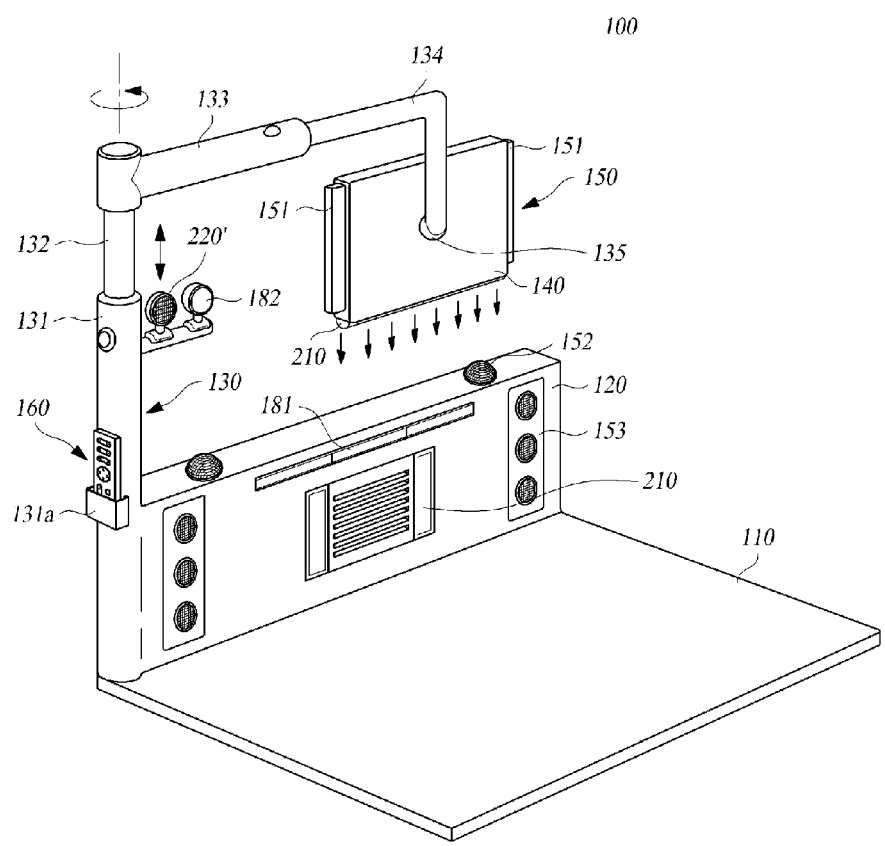
FIG. 1c is a perspective view showing a display system according to a second embodiment of the present invention.
Figure 2:
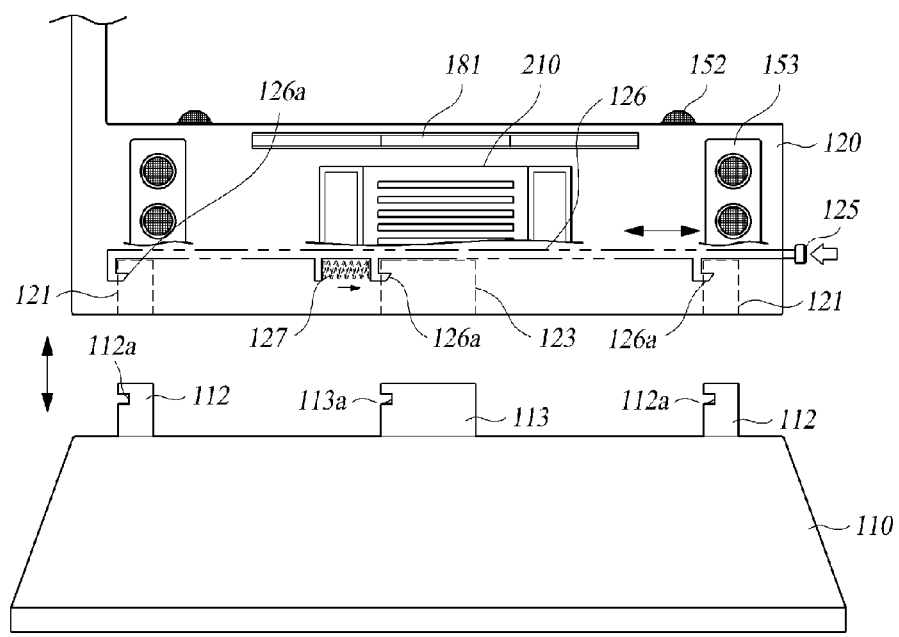

In the meantime, according to a second embodiment of the present invention, as shown in FIG. 1c, a thermometer 220' can be disposed on the main post 131 using a separate bracket or the like such that the angle thereof can be adjusted in the upward and downward direction and the lateral direction. The thermometer 220 can be on/off-operated by the control operation of the control device 160. In addition, the thermometer can be disposed on the rear support member 120, the support unit 130, or the like in a variety of fashions.

The control device 160 includes the remote control 161, a setting section 162, a storage section 163 and a control section 164. The remote control 161 can include a first operating section 161a which controls the lift-driving part 171, a second operating section 161b which controls the pivot-driving part 172, a third operating section 161c which controls the reciprocation-driving part 173, a fourth operating section 161d which controls the angle adjustment driving part 174, a switch 161e which controls the on/off operation of the display device 140, an illumination operating section 161f which adjusts the on/off operation and the intensity of illumination of the illumination device 180, a sterilization operating section 161g which adjusts the on/off operation and sterilization time of the sterilization unit 145, and a body temperature measurement operating section 161h which adjusts the on/off operation and the scanning angle of the thermometer 220. In addition, it should be understood that the remote control 161 can be provided with operation buttons with which a variety of functions are controlled.

The setting section 162 can be separately provided on the display device 140, be provided on the remote control 161, or be provided on the rear support member 120 or the like. With the setting section 162, after the user has adjusted the position of the display device 140 where he/she watches the display device 140 by manipulating the support unit 130, the user can set this position as a user-specific watching position. For example, after the user adjusts the position of the display device 140 by manipulating the remote control 161, the user can set the positional value by manipulating the setting section 162. In addition, information set at the setting section 162 is stored depending on the user in the storage section 163 such that the position of the display device 140 can be moved based on positional values that are previously set depending on the user or positional values that were set most recently and then restored to the initial position (the position shown in FIG. 1).

The control section 164 is intended to control the operation of the lift-driving part 171, the pivot-driving part 172, the reciprocation-driving part 173, the angle adjustment driving part 174, the sound output device 150, the display device 140, the sterilization unit 145 and the thermometer 220 based on the information generated at the remote control 161. The control section 164 also controls the display device 140 to be moved to a previously set position by the on/off operation of the display device 140 and to the initial position by the off operation of the display device 140.

In the meantime, the method of setting the position of the display device 140 can consist of the following.

For instance, when the user presses the on button of the switch 161e for about 3 seconds after adjusting the height, length, angle of rotation, position/direction, or the like of the display device 140 using the remote control 161, the current state is automatically stored. Consequently, when turning on the display device 140 at future time, the control section 164 automatically controls the operation of all the driving parts based on the set information that was previously stored so that all the driving parts automatically move to the set positions.

In addition, when the off button of the switch 161e is pressed for about 3 seconds after the display device 140 is moved to the initial position shown in FIG. 1a, the control section 164 automatically stores the positional value of the current state as a value of setting. Consequently, when the display device 140 is turned off from the next time, the control section 164 can automatically restore the display device 140 to the initial position based on the set value that was previously stored.

In addition, as shown in FIG. 10 to FIG. 13, a third embodiment of the present invention is characterized in that an input device 190 is slidably disposed on the rear side of a display device 140'. Here, the display device 140' can be complex electronic equipment which has not only the function of a TV but also the function of a PC, or selectively display a TV screen or a PC screen. In particular, the screen provided from the display device 140' can be one selected from the TV screen and the PC screen depending on the position of the input device.

Here, it is preferred that the input device 190 include a keyboard for a PC. It is preferred that the input device 190 be disposed such that it can slide in the upward and downward direction along a guide rail (141, see FIG. 12) which is disposed on the rear surface of the display device 140'. In addition, the input device 190 is provided with a guide member 191 which can move along a guide rail 141. A variety of applications is possible for the sliding structure which allows the input device 190 to slide with respect to the display device 140'.

Figure 10:
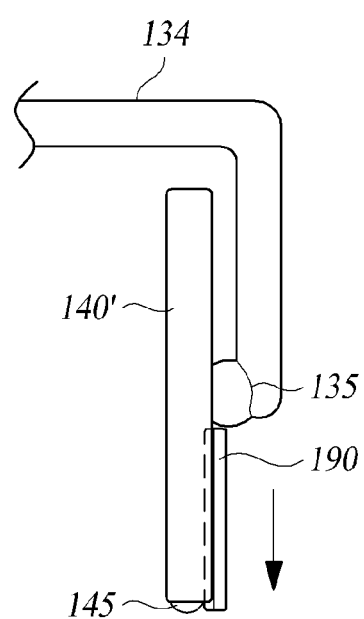
FIG. 10 to FIG. 13 are views respectively illustrating a display system according to a third embodiment of the present invention.
Figure 11:
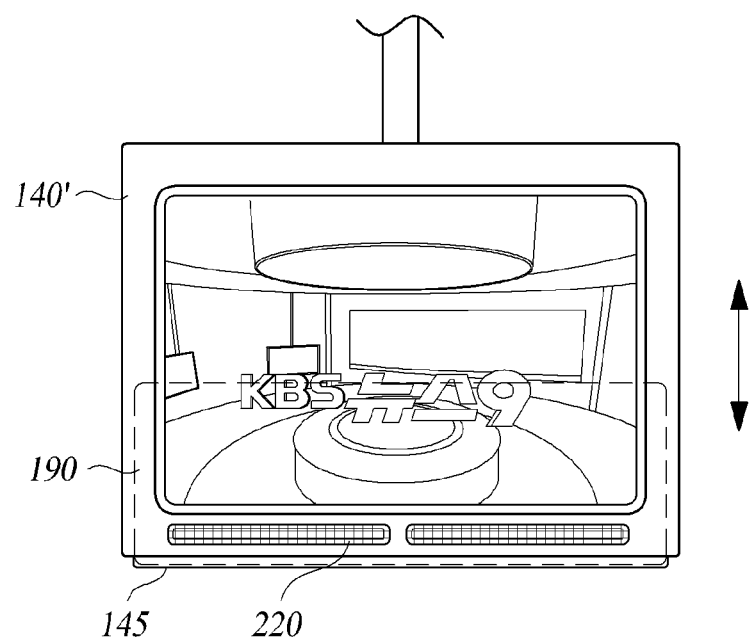
Figure 12:
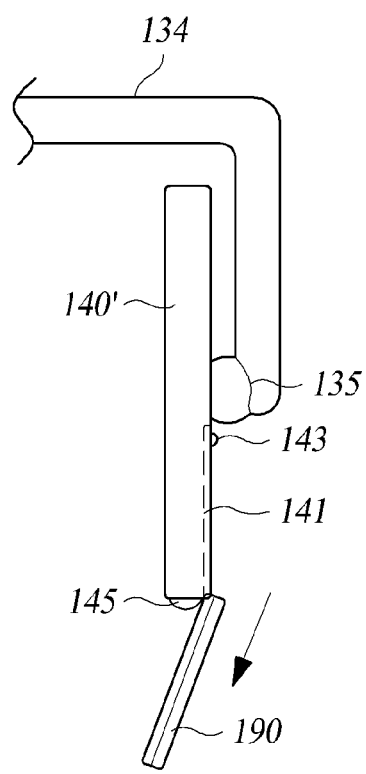
Figure 13:
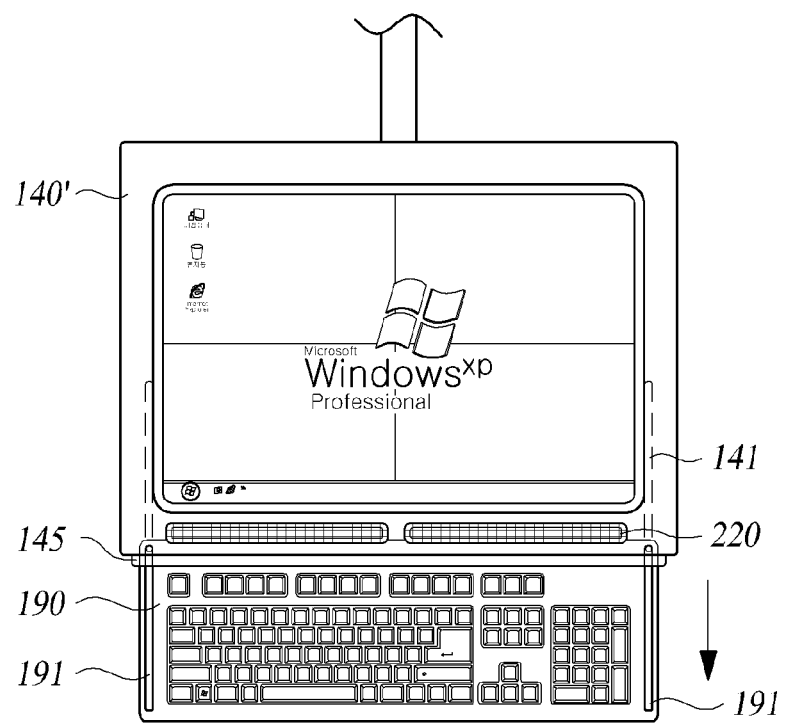

According to the above-described configuration, the display device 140' displays the TV screen in the state where the input device 190 is concealed behind the display device 140', as shown in FIG. 10 and FIG. 11. In addition, as shown in FIG. 12 and FIG. 13, in the state where the input device 190 is moved downward so as to be exposed to the front, the PC screen can be displayed.

A control switch 143 which changes the screen of the display device 140' depending on the position to which the input device 190 has moved can be disposed behind the display device 140'. It is possible to control the TV screen to be displayed when the control switch 143 is interfered with by the input device 190 and the PC screen to be exposed when the interference by the input device 190 is removed.

The display system according to the first to third embodiments of the present invention having the above-described configurations can be disposed on a bed or be used such that the base member 110 is covered with a mattress or a bedding covering.

Since the user can watch the TV screen or the PC screen in the posture where he/she has lain on a bed, a mattress, a quilted mattress or the like, the user can use the display device 140, 140' in a posture more comfortable than in the related art.

In addition, since not only the display device 140, 140' is used but also the sterilization unit 145, the air cleaner 210 and the thermometer 220 are provided, it is possible to check the health of the user and maintain a clean sleeping environment.

Furthermore, since the user uses the display device 140, 140' in a posture where he/she has lain on the sleeping area, it is possible to use the display device in the state where lights installed in a living room, a room, or the like are turned off. Since the display device provides concentrated illumination to the user who has lain on the sleeping area, the user can watch the TV or use the PC screen without disturbing others.

In addition, since the position of use and the initial position of the display device 140, 140' are set, it is possible to automatically adjust the position of the display device 140, 140' to the position of use or the initial position through the on/off operation of the display device. Accordingly, there is an advantage in that it is not necessary for the user to adjust the position every time that he/she uses the display device.

Furthermore, referring to FIG. 14 to FIG. 20, a display system 300 according to a fourth embodiment of the present invention includes a base member 310, a rear support member 320 which is disposed on one end of the base member 310, a support unit 330 which is disposed on the rear support member 320, a display device 340 which is supported on the support unit 330, a sound output device 360, a control device 370, an air cleaner 380 and an illumination device 390.

Figure 14:
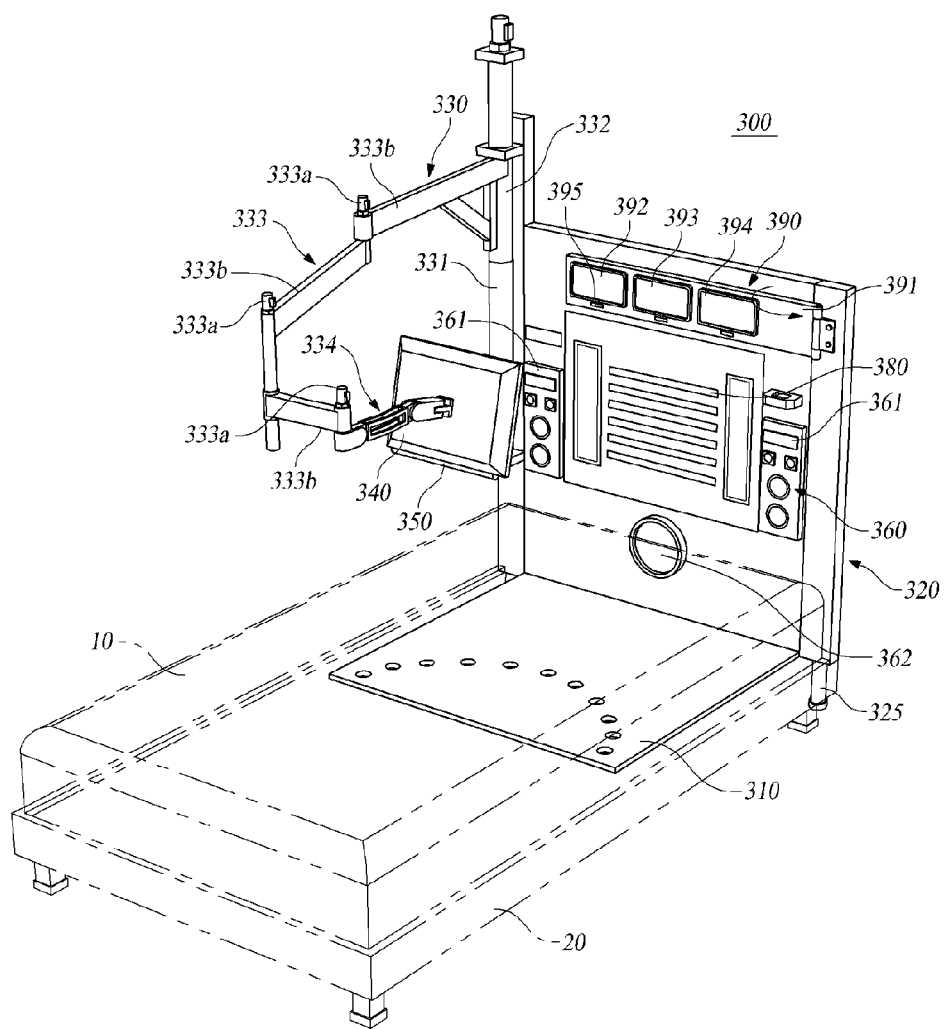
FIG. 14 is a schematic perspective view showing a display system according to a fourth embodiment of the present invention.
Figure 15:
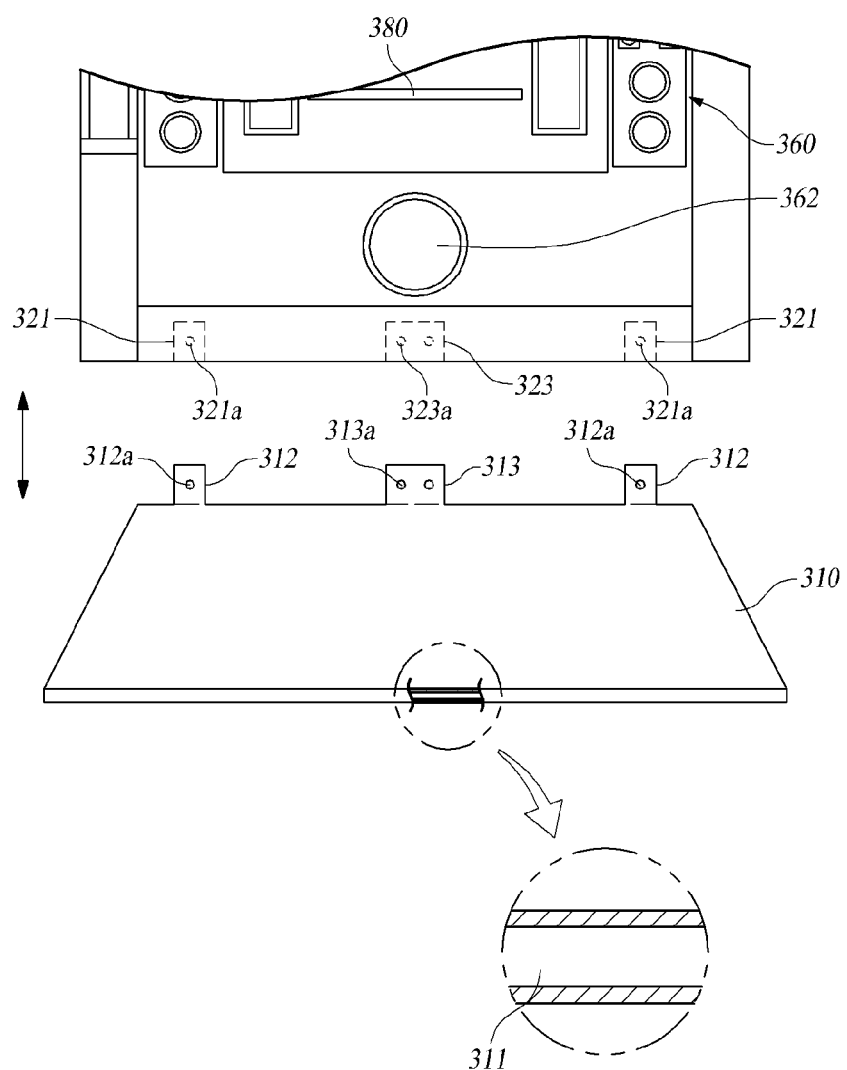
FIG. 15 is a view illustrating the coupling relationship between the base member and the rear support member of the display system shown in FIG. 14.
Figure 16:
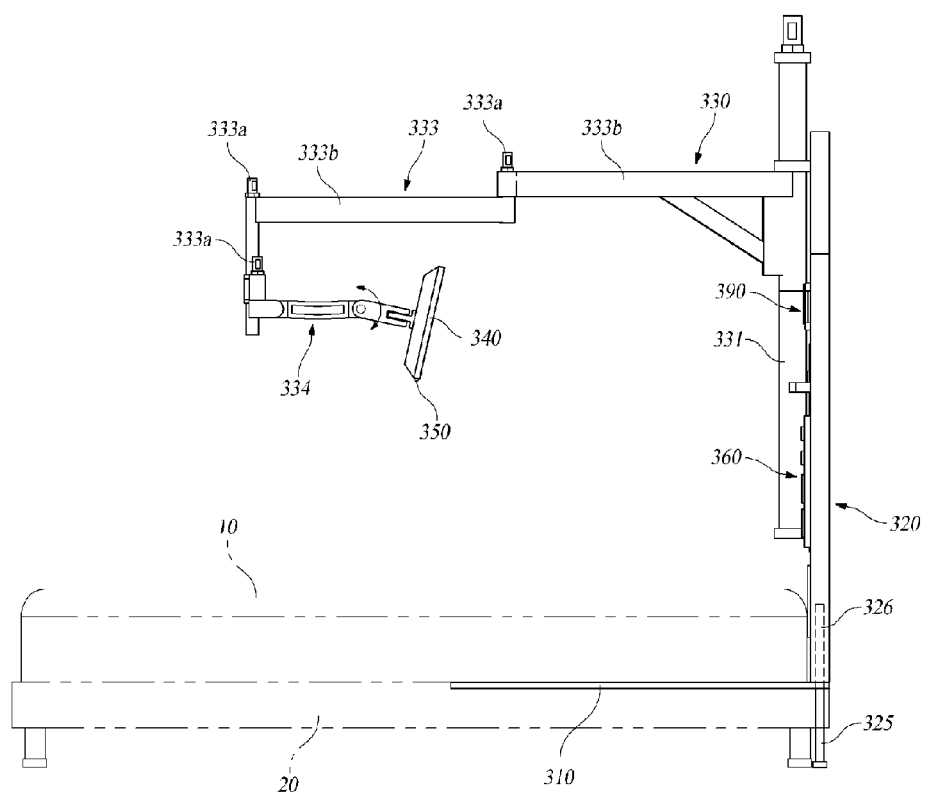
FIG. 16 is a side elevation view of the display system shown in FIG. 14.
Figure 17:
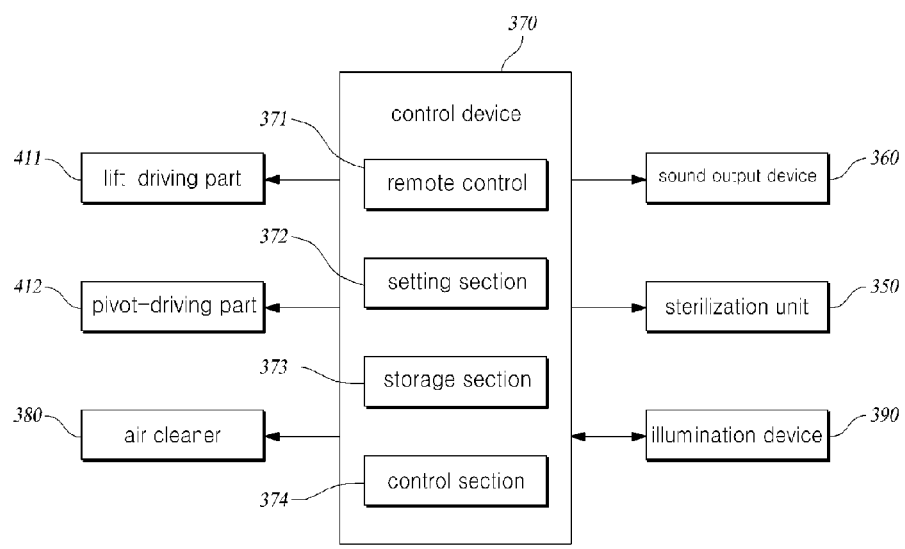
FIG. 17 is a block diagram illustrating a display system according to the fourth embodiment of the present invention.

The base member 310 is made of a material such as metal or the like, and as shown in FIG. 16, can have a plate structure such that a hollow space 311 is defined in the inner portion thereof. This allows sound and vibration transmitted through the rear support member 320 to create a vibration effect while being transferred into the hollow space 311 of the base member 310, thereby improving sound production. The base member 310 can be provided on one end thereof with a plurality of coupling members 312 and 313, with which the base member 310 is coupled with the rear support member 320. The coupling members 312 and 313 can be formed integrally with the base member 310 or be coupled to the base member 310 after being separately fabricated. As shown in FIG. 14, the base member 310 having this configuration is disposed on a bed 20, and a mattress 10 can be laid thereon. Of course, it is possible to use the base member 310 by disposing it on the floor and placing the mattress 10 thereon.

The rear support member 320 is coupled to one end of the base member 310 such that it is erected in the upward and downward direction or be inclined at a preset angle. It is preferred that the rear support member 320 be assembled to the base member 310 through the coupling members 312 and 313 such that the rear support member 320 can be coupled to and decoupled from the base member 310. This rear support member 320 also has an inner space, and is provided at the lower end with coupling portions 321 and 323 into which the coupling members 312 and 313 can be fitted for engagement. In this configuration, in the state where the coupling members 312 and 313 are fitted into the coupling portions 321 and 323, bolts can be fastened into fastening holes 312a, 313a, 321a and 323a which are respectively formed in the coupling members 312 and 313 and the coupling portions 321 and 323, whereby the rear support member 320 can be coupled to the base member 310. In addition, it should be understood that the base member 310 can be coupled with the rear support member 320 in a variety of methods in addition to the above-described coupling method.

In addition, as shown in FIG. 16, it is preferred that an auxiliary support 325 which is detachably coupled to the lower end of the rear support member 320 be further provided. When the auxiliary support 325 is disposed on the bed 20 as shown in FIG. 14, the height of the auxiliary support 325 can be adjusted to the height corresponding to the height of the bed, whereby the load of the rear support member 320 can be firmly supported on the floor. The auxiliary support 325 is assembled to a mounting portion 326 of the rear support member 320 using a screw such that the auxiliary support 325 can be coupled to and decoupled from the mounting portion 326. When assembled, the height of the auxiliary support 325 can be adjusted to the height of the bed 20 depending on the degree at which the screw is engaged.

The support unit 330 includes a main post 331 which is disposed on the upper portion of one side of the rear support member 320, an lift post 332 which is disposed on the main post 331 such that it can be adjusted in height in the upward and downward direction, a pivot assembly 333 which is rotatably disposed on the upper portion of the lift post 332, and a connecting member 334 which connects the pivot assembly 333 to the display device 340.

The lift post 332 is disposed on the main post 331 such that it can slide upward and downward along the main post 331, whereby the height of the pivot assembly 333 can be adjusted. The lift post 332 can be automatically driven in the upward and downward direction by a separate lift-driving part 311 which is disposed in the main post 331 such that the lift post 332. The lift-driving part 311 can operate in response to a control signal from the control device 370. The lift-driving part 311 can be embodied based on a variety of known technologies. The lift-driving part 311 can be configured such that it drives the lift post 332 in the upward and downward direction using a linear motor, a lead screw connected to a spindle motor, a hydraulic cylinder, or the like.

The pivot assembly 333 is pivotably disposed on the upper portion of the lift post 332. The pivot assembly 333 is configured such that it positions the display device 340 away from or toward the rear support member 320 at normal times, and includes a plurality of joints 333a and a plurality of links 333b. The plurality of joints 333a can be respectively and independently operated by a control signal from the control device 370 so as to respectively adjust the angles between the links 333b. The joints 333a are respectively provided with pivot-driving parts 412 such that the angles thereof can be adjusted within preset ranges of angles. Here, the pivot-driving parts 412 can include spindle motors which are respectively disposed on the joints 333a, and a reduction gear train can be disposed between the spindle motor links 333b and connected to a drive shaft of a spindle motor to reduce the speed of rotation, whereby the speeds of the links 333b which are disposed on both sides of the joints 333a can be adjusted. Specifically, since the spindle motor is fixed to one of the links 333b which are connected together through the joints 333a and a follower gear which receives power transmitted from the drive shaft of the spindle motor through the gear train is fixed to the other one of the links 333b, the angles of the links 333b can be adjusted. In addition, the control device 370 can control to stop the operation of the spindle motor depending on the size of the load applied to the drive shaft when the spindle motor is operating, thereby automatically stopping the operation of the pivot-driving part 412 when the joints 333a are completely bent. Specifically, when the joints 333a are completely bent and do not pivot any further, a load that is the same as or greater than a preset level acts on the spindle motor. When the load that is the same as or greater than the preset level acts on the spindle motor, it is possible to stop the operation of the spindle motor, thereby preventing the joints 333a and the pivot-driving parts 412 from being damaged. Since the configuration and operational technologies of the pivot-driving parts 412 are apparent to a person having ordinary skill in the art from technical configurations that are widely used in the industry, further specific descriptions thereof will be omitted.

The connecting member 334 connects the display device 340 to the pivot assembly 333. The connecting member 334 can have one or more joints and links in order to adjust the position and direction of the display device 340 with respect to the pivot assembly 333, and the angles of the joints and links can be manually adjusted. It is also possible to provide a driving part the operation of which is controlled by the control device 370 like the pivot-driving part 412 which drives the pivot assembly 333 to pivot as described above, whereby the position and direction of the display device 340 can be automatically adjusted.

The display device 340 can include a liquid crystal display (LCD) TV, a plasma display panel (PDP) TV, a light-emitting diode (LED) TV, or the like, and its size can vary. The rear side of the display device 340 is connected to the connecting member 335 such that the screen of the display device 340 is exposed to the front.

The sterilization unit 350 can be implemented as an ultraviolet (UV) radiation lamp or an infrared (IR) radiation lamp, and the shape and arrangement thereof can vary.

The UV radiation lamp has the function of sterilizing a variety of harmful bacteria and microorganisms that live in a sleeping area or the like where a bed or a mattress is placed using a UV wavelength emitted therefrom. Since UV radiation can cause side effects such as skin cancer when the human body is exposed to an excessive amount of UV radiation, it is not preferable to directly expose the human body to UV radiation. Therefore, it is preferred that the bed be sterilized or disinfected with UV radiation while a person is not using the bed. Accordingly, a user can sleep on the mattress or the bed which is in the clean state.

Like visible light or UV radiation, IR radiation emitted from the IR radiation lamp is a type of an electromagnetic wave, the wavelength of which is longer than that of visible light. Since the wavelength of IR radiation is in substantially the same range as the natural frequency of molecules that compose matter, the energy of an IR light wavelength is effectively absorbed into matter due to electromagnetic resonance when IR radiation strikes the matter. Thus, this thermal action helps eliminate bacteria that cause a variety of diseases in the human body while promoting the circulation of the blood and the creation of cell tissues by expanding capillary vessels. Accordingly, this can be a great help to a user in terms of health, cosmetic treatment and disease prevention.

In the sterilization unit 345, the sterilization time setting, the on/off operation of the UV radiation lamp and the IR radiation lamp, or the like can be controlled by the control device 370.

Figure 18:
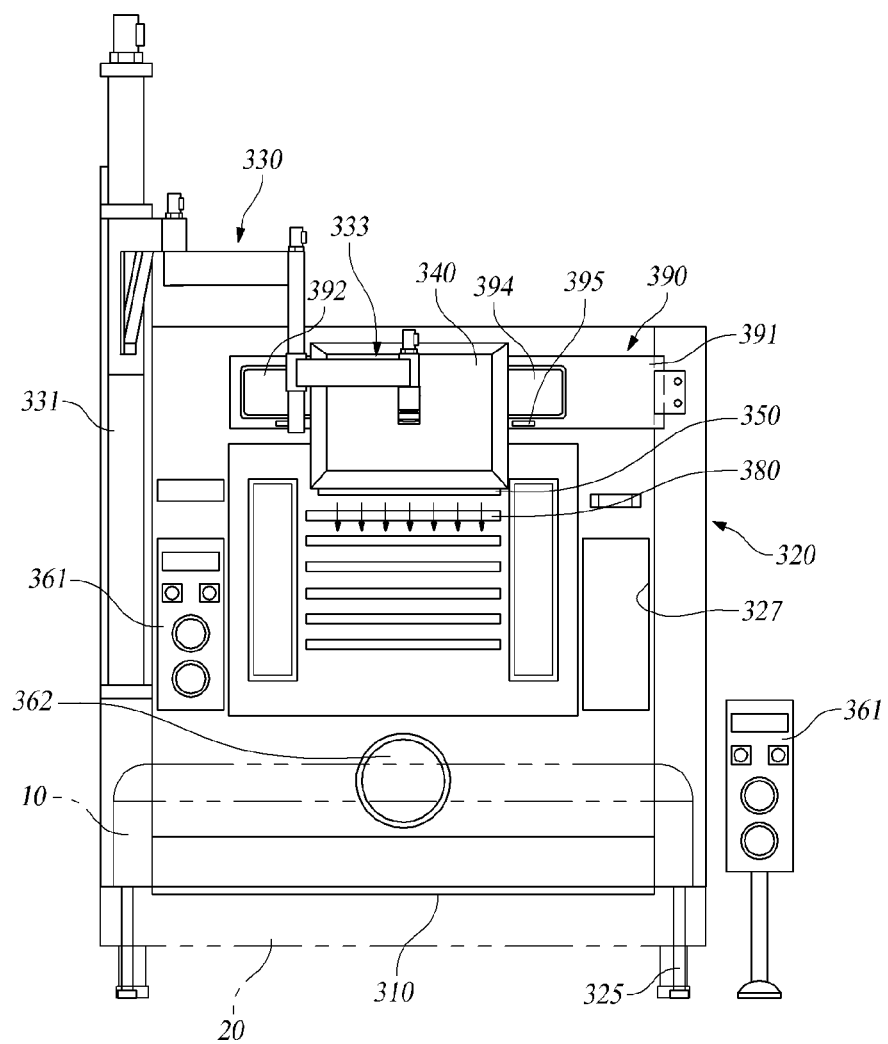
FIG. 18 is a front elevation view of the display system according to the fourth embodiment of the present invention.
Figure 19:
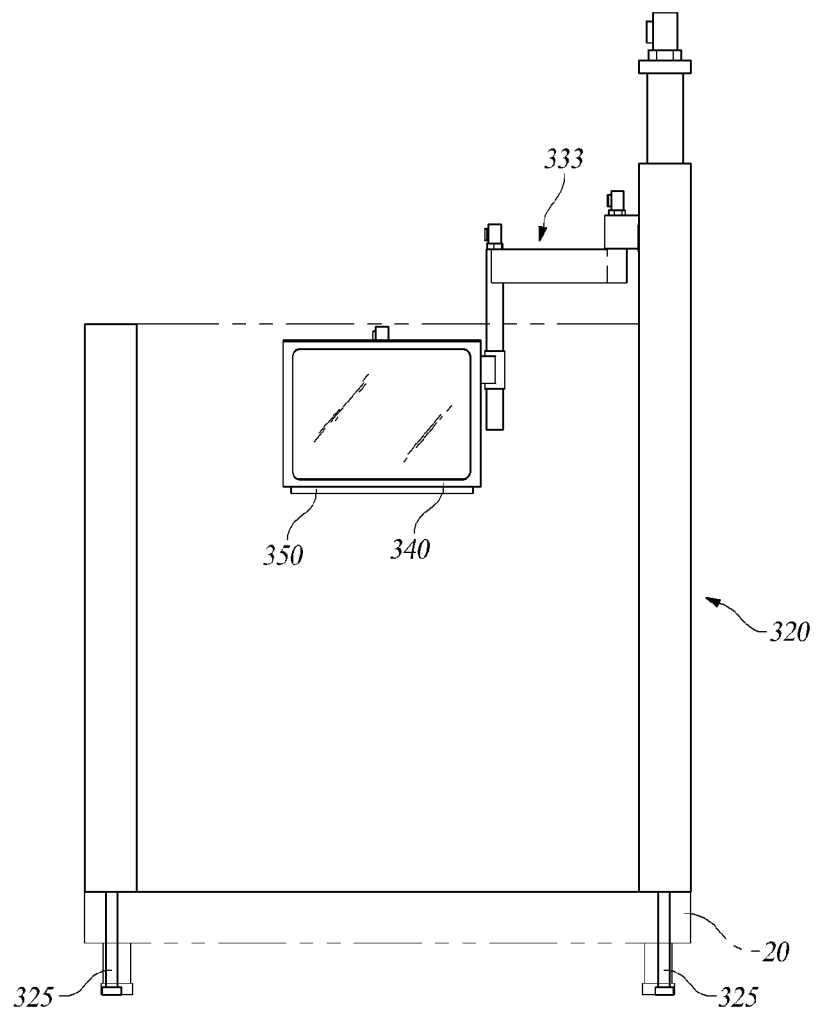
FIG. 19 is a rear elevation view of the display system according to the fourth embodiment of the present invention.
Figure 20:
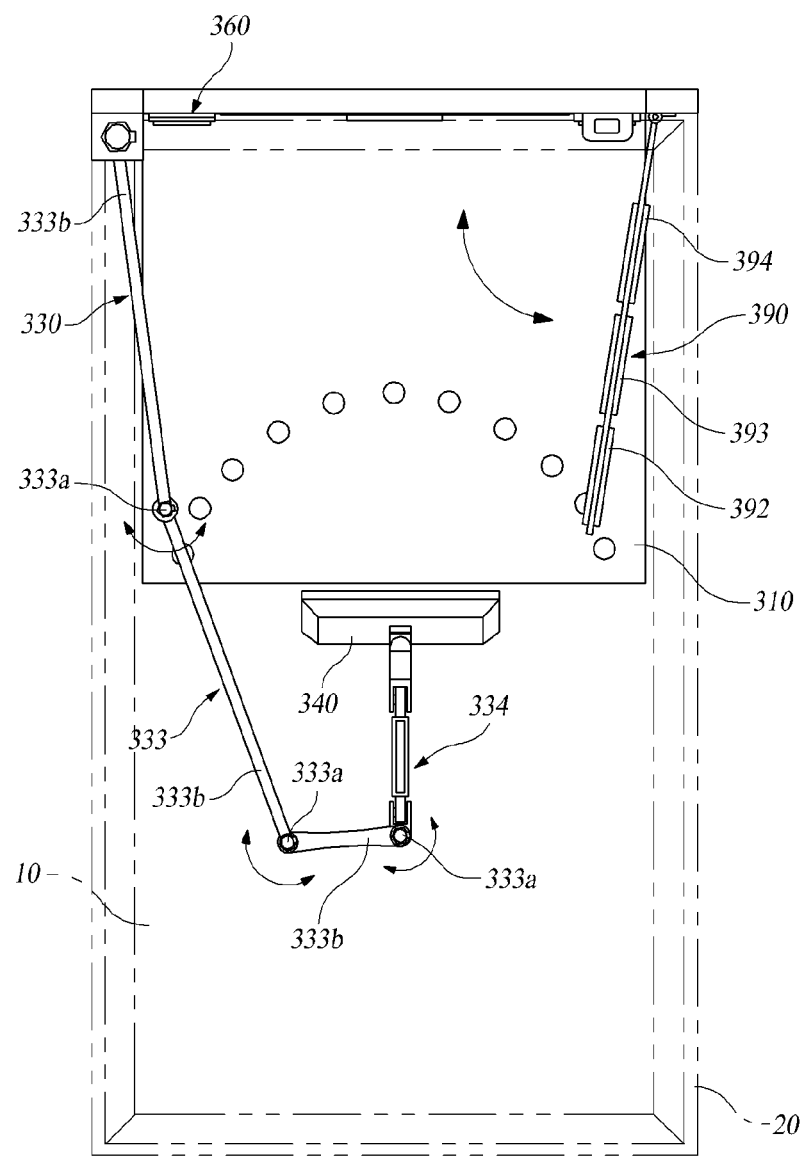
FIG. 20 is a top plan view of the display system according to the fourth embodiment of the present invention.

The sound output device 360 includes first speakers 361 and second speakers 362. A pair of the first speakers 361 can be detachably disposed on the rear support member 320. For this, the rear support member 320 can be provided with speaker mounting portions 327. Therefore, it is possible to use the first speakers 361 by mounting them on the rear support member 320 or, as shown in FIG. 18, on additional supports separate from the rear support member 320 depending on the preference of the user. The second speakers 362 are disposed on the lower portion of the rear support member 320. Since the second speakers 362 are disposed at positions where parts thereof are covered with the mattress 10, sound and vibration can be transmitted through the mattress 10 and effectively transmitted to the base member 310.

In addition, the rear support member 320 can also be provided with the air cleaner 380. Since the air cleaner 380 converts polluted air into fresh air by filtering the polluted air, a user can maintain a comfortable and clean environment. The operation of the air cleaner 380 can also be controlled by the control device 370 or be set by a switching means which is provided thereto.

The illumination device 390 includes a light support 391 which is movably disposed on the rear support member 320, a plurality of lights 392, 393 and 394 which are disposed on the light support 391 and a light switch 395 which selects the on/off operation of the lights. The light support 391 is pivotably disposed on one portion of the rear support member 320. Accordingly, the direction in which light from the lights 392, 393 and 394 supported by the light support 391 is emitted can be adjusted. The plurality of lights 392, 393 and 394 can be disposed such that they emit different types of light. For example, one light 392 can be a light which emits typical white light and is on/off controlled by the manipulation of the light switch 395, whereas the second light 393 can be a light that can be switched between psychedelic illumination mode and typical illumination mode in which one of the psychedelic illumination mode and the typical illumination mode can be selected by the manipulation of the light switch 395 or the control device 370. When switched into the psychedelic illumination mode, the light can be controlled to flash on and off, thereby producing an exciting mood. In addition, the rest light 394 is a bedtime light which can be configured so as to emit light having a low illumination intensity.

Of course, it should be understood that the intensities of illumination of the plurality of lights 392, 393 and 394 as described above can be adjusted by the control operation of the control device 370, and that additional lights can be disposed at a variety of other positions. In addition, the plurality of lights 392, 393 and 394 can include light-emitting diode (LED) lamps and a variety of other types of lamps.

The control device 370 includes the remote control 371, a setting section 372, a storage section 373 and a control section 374. The remote control 371 has a variety of manipulation buttons which control the on/off operation of a lift-driving part 411, a pivot-driving part 412, the sterilization unit 350, the air cleaner 380 and the illumination device 390, and can remotely control the respective devices.

The setting section 372 can be separately provided in the display device 340 or be provided in the remote control 371, the rear support member 320, or the like. With the setting section 372, after the user has adjusted the position of the display device 340 where he/she watches the display device 340 by manipulating the support unit 330, the user can set this position as a user-specific watching position. For example, after the user adjusts the position of the display device 340 by manipulating the remote control 371, the user can set the positional value by manipulating the setting section 372. In addition, information set at the setting section 372 is stored depending on the user in the storage section 373 such that the position of the display device 340 can be moved based on positional values that are previously set depending on the user or positional values that were set most recently and then restored to the initial position. In addition, during the operation of restoring to the initial position from the set position, the user can temporarily stop the operation of restoring to the initial position by manipulating the remote control 371.

The control section 374 is intended to control the operation of the lift-driving part 411, the pivot-driving part 412, the sound output device 360, the display device 340, the sterilization unit 350 and the air cleaner based on the information generated at the remote control 371. The control section 374 also controls the display device 340 to be moved to a previously set position in response to the on or off operation of the display device 340 and to the initial position in response to the off operation of the display device 340.

In the meantime, the method of setting the position of the display device 340 can be as follows.

For instance, when the user presses the on button of the switch of the remote control 371 for about 3 seconds after adjusting the height, length, angle of rotation, position/direction, or the like of the display device 340 using the remote control 371, the current state is automatically stored. Consequently, when turning on the display device 340 from the next time, the control section 374 automatically controls the operation of all the driving parts based on the set information that was previously stored so that all the driving parts automatically move to the set positions.

In addition, when the off button of the remote control 371 is pressed for about 3 seconds after the display device 340 is moved to the initial position, the control section 374 automatically stores the positional value of the current state as a value of setting. Consequently, when the display device 340 is turned off from the next time, the control section 374 can automatically restore the display device 340 to the initial position based on the set value that was previously stored.

Furthermore, when the control section 374 adjusts the position of the display device 340 by pivoting the pivot assembly by controlling the operation of the pivot-driving parts 412, the control section 374 forcibly stops the pivot-driving parts 412 if the size of a load applied to the pivot-driving parts 412 is the same as or greater than a preset load. Accordingly, when the pivot-driving parts 412 are operated to restore the display device 340 to the initial position from the position of use or to an intended position, a load is applied to the pivot-driving parts 412 when the display device 340, for example, collides against a person. If the applied load is the same as or greater than the preset load, the control section 374 forcibly stops the operation of the pivot-driving parts 412 in order to prevent not only the pivot-driving parts 412 from being broken but also protecting a person from injury.

The display system according to the third embodiment of the present invention having the above-described configuration can be used in the state in which it is disposed on a bed or the base member 310 thereof that is covered with a mattress or a bedding covering.

Since the user can watch the TV screen or the PC screen in the posture where he/she has lain on a bed, a mattress, a quilted mattress or the like, the user can use the display device 340, 340' in a position and direction more comfortable than in the related art.

In addition, since not only the display device 340, 340' is used but also the sterilization unit 350 and the air cleaner 380 are provided, it is possible to check the health condition of a user and maintain a clean sleeping area.

Furthermore, since the user uses the display device 340, 340' in the posture where he/she has lain on a sleeping area, it is possible to use the display device in the state where lights installed in a living room, a room, or the like are turned off. Since the display device provides concentrated illumination to the user who has lain on the sleeping area, the user can watch the TV or use the PC screen without disturbing others.

In addition, since the position of use and the initial position of the display device 340, 340' are set, it is possible to automatically adjust the position of the display device 340, 340' to the position of use or the initial position through the on/off operation of the display device. Accordingly, there is an advantage in that it is not necessary for a user to adjust the position every time that he/she uses the display device.

Although the present invention has been illustrated and described in relation to the exemplary embodiments that are provided for illustrative purposes, the present invention is by no means limited to the constitutions and functions as having been illustrated and described. It will be apparent, however, to those skilled in the art that a variety of changes and modifications to the present invention are possible without departing from the principle and scope of the appended Claims.

DESCRIPTION OF THE REFERENCE NUMERALS IN THE DRAWINGS 110, 310: base member
120, 320: rear support member
130, 330: support unit
140, 140', 340, 340': display device
145, 350: sterilization unit
150, 360: sound output device
160, 370: control device
180, 390: illumination device
210, 380: air cleaner
220: thermometer

The invention claimed is:

1. A display system comprising:
a base member;
a rear support member which is connected to one end of the base member;
a display device;
a support unit which is disposed on an upper portion of the rear support member, and supports the display device such that the display device is movable in position and changeable in position in at least two axial directions;
a sound output device which is disposed on the display device and the rear support member; and
a control device which controls operations of the support unit, the sound output device and the display device,
wherein a bed, a mattress, or a bedding covering is provided on the base member such that a user can watch a screen of the display device in a posture where the user has lain above the base member.

2. The display system according to claim 1, wherein the base member defines therein an inner space, and comprises a plurality of coupling members which protrude upward, the plurality of coupling members detachably engaging with the rear support member.

3. The display system according to claim 1, wherein the support unit comprises:
a main post which is disposed on an upper portion of the rear support member;
a lift post which is disposed on the main post such that a height thereof is adjustable vertically;
a pivot member which is rotatably disposed on an upper portion of the lift post;
an extension member which extends from the pivot member such that a length thereof is adjustable; and
a connecting member which connects and supports the display device to an end of the extension member such that a position of the display device is changeable.

4. The display system according to claim 3, wherein the support unit comprises:
a lift-driving part which drives the lift post to move upward or downward with respect to the main post;
a pivot-driving part which drives the pivot member to rotate with respect to the lift post;
a reciprocation-driving part which causes the extension member to linearly reciprocate with respect to the pivot-driving member; and
an angle adjustment driving part which is disposed on the connecting member, and adjusts an angle of the display device vertically or horizontally.

5. The display system according to claim 1, wherein the sound output device comprises:
a first speaker which is movably disposed on the display device;
one or more second speakers which are disposed on an upper portion of the rear support member; and
a third speaker which is disposed on a front portion of the rear support member or the base member.

6. The display system according to claim 1, further comprising:
an input device which is disposed on the display device such that the input device is reciprocally slidable; and
a control switch which changes screen information displayed on the display device depending on a position to which the input device has moved,
wherein a TV screen or a PC screen is selectively displayed on the display device due to an on/off operation of the control switch.

7. The display system according to claim 1, further comprising a sterilization unit which is disposed on the display device and uses UV radiation or IR radiation.

8. The display system according to claim 1, further comprising a thermometer which is disposed on at least one of the display device, the rear support member and the support unit, wherein the thermometer measures body temperature through IR radiation scanning in response to the control device.

9. The display system according to claim 1, further comprising an air cleaner which is disposed on the rear support member, an air control function of the air cleaner being controllable by the control device.

10. The display system according to claim 1, further comprising an illumination device which is disposed on at least one of the rear support member and the support unit, an intensity of illumination of the illumination device being adjustable by the control device.

11. The display system according to claim 10, wherein the illumination device comprises:
a light support which is disposed movable with respect to the rear support member;
one or more lights which are supported by the light support, and are drive-controlled by the control device independently from each other; and
a light switch which selects an on/off operation of the light.

12. The display system according to claim 11, wherein the one or more lights include a typical light and a psychedelic light, and the control device selectively drives the typical light or the psychedelic light in response to an operation signal of the light switch.

13. The display system according to claim 1, wherein the support unit comprises:
a main post which is disposed on the rear support member;
a lift post which is disposed on the main post such that a height thereof is adjustable vertically;
a pivot assembly which is rotatably disposed on the lift post, and has one or more joints which are adjustable in angle; and
a connecting member which connects the pivot assembly to the display device.

14. The display system according to claim 13, further comprising:
a lift-driving part which drives the lift post to move upward or downward with respect to the main post; and a pivot-driving part which drives the pivot assembly to rotate with respect to the lift post.

15. The display system according to claim 14, wherein the control device controls to forcibly stop the pivot-driving part operating when a load that is equal to or greater than a predetermined pivot load occurs when the pivot-driving part is operating.

16. The display system according to claim 1, further comprising an auxiliary member which is detachably disposed on the base member or the rear support member, wherein, when the base member is installed in a bed, the auxiliary member is mounted so as to support a load of the rear support member at a height of the bed.

* * * * *